United States Patent
Diederichs

[19]

[11] Patent Number: 6,059,338
[45] Date of Patent: May 9, 2000

[54] PIPE CONNECTION

[75] Inventor: Rolf Diederichs, Willich, Germany

[73] Assignee: Mannesmann AG, Dusseldorf, Germany

[21] Appl. No.: 09/125,913

[22] PCT Filed: Feb. 19, 1997

[86] PCT No.: PCT/DE97/00365

§ 371 Date: Aug. 27, 1998

§ 102(e) Date: Aug. 27, 1998

[87] PCT Pub. No.: WO97/32153

PCT Pub. Date: Sep. 4, 1997

[30] Foreign Application Priority Data

Feb. 28, 1996 [DE] Germany .......................... 196 09 257

[51] Int. Cl.$^7$ ....................................................... F16L 9/14
[52] U.S. Cl. ...................... 295/55; 285/370; 285/382.2; 285/383; 285/422; 285/915
[58] Field of Search ................... 285/382.2, 371, 285/906, 915, 370, 397, 55, 383, 422; 29/516

[56] References Cited

U.S. PATENT DOCUMENTS

| | | | |
|---|---|---|---|
| 1,911,775 | 5/1933 | Smith et al. | 285/382.2 X |
| 2,192,914 | 3/1940 | Ice | 285/382.2 X |
| 2,346,051 | 4/1944 | Seamark | 285/906 X |
| 3,068,563 | 12/1962 | Reverman | 295/915 X |
| 3,343,252 | 9/1967 | Reesor | 289/915 X |
| 3,434,900 | 3/1969 | Bender | 285/45 X |
| 3,579,794 | 5/1971 | Powell | 285/382.2 X |
| 4,850,621 | 7/1989 | Umehara | 285/322 |

FOREIGN PATENT DOCUMENTS

| | | | |
|---|---|---|---|
| 281980 | 12/1964 | Australia | 285/382.2 |
| 7406802 | 7/1974 | Germany | F16L 47/02 |
| 648 643 | 3/1985 | Germany | F16L 13/14 |
| 91 13 050 | 10/1991 | Germany | F16L 47/04 |

OTHER PUBLICATIONS

Deutsche ALWA GmbH, "cufix Manschetten Preβfittings" Sep. 1993, pp. 11–14.
Geberit GmbH, "Geberit Sanitävtechnik mit System", Feb. 1995.

*Primary Examiner*—Dave W. Arola
*Attorney, Agent, or Firm*—Cohen, Pontani, Lieberman & Pavane

[57] ABSTRACT

A pipe connection includes a pipe having a smooth-ended end portion pushed onto a sleeve-like region of a fitting. The fitting includes a stop at one end of the sleeve-like region. A seal is arranged between the sleeve-like region of the fitting and the pipe. The pipe and the fitting are formed from a plastically deformable metal. A bead like deformation formed using an externally applied pressing tool axially secured the pipe and the fitting to one another. The deformation encompasses the pipe and the fitting and is located at a small enough distance from a free end of the sleeve-like region of the fitting so that the seal in this location is included in the deformation.

9 Claims, 3 Drawing Sheets

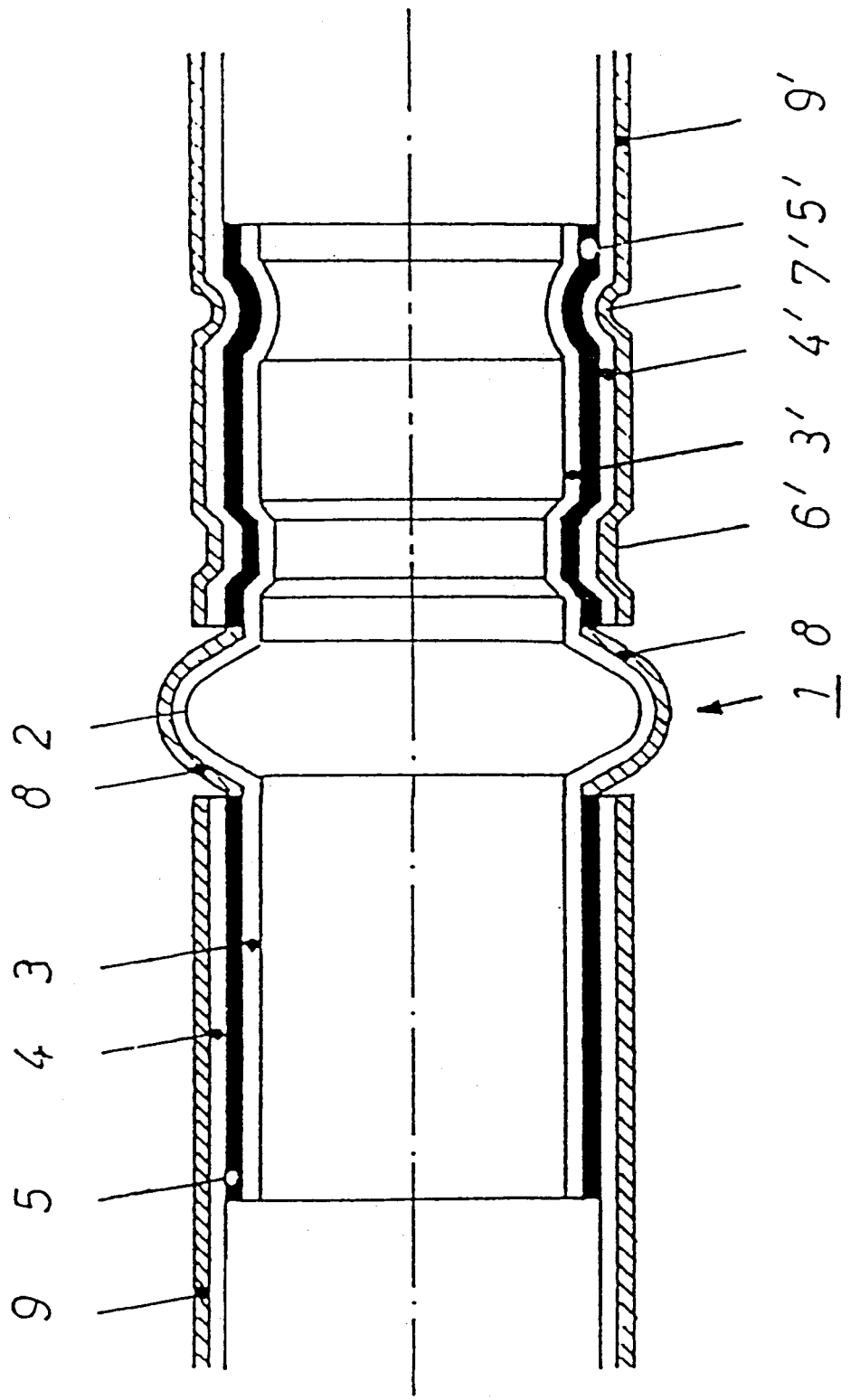

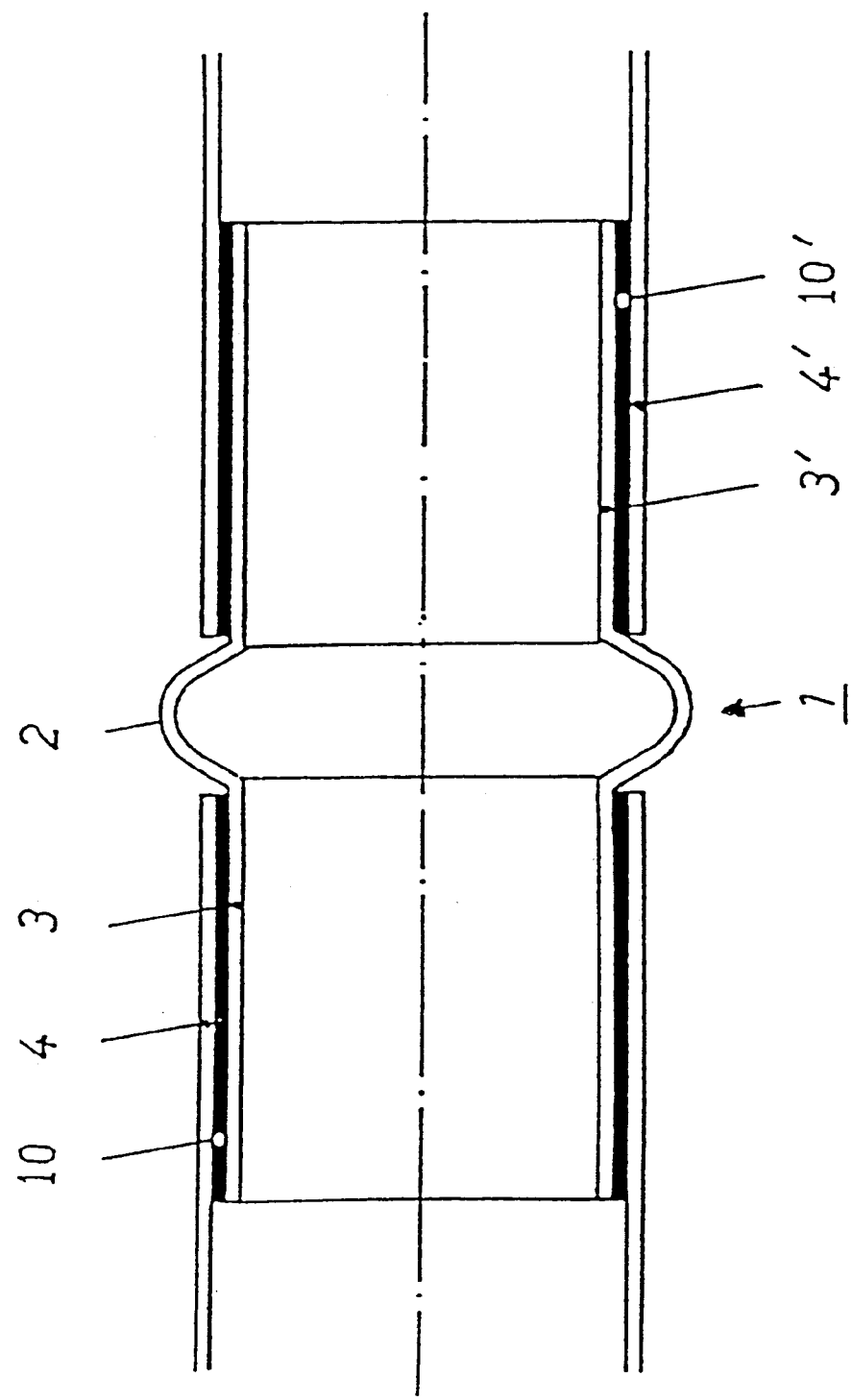

PIPE CONNECTION

BACKGROUND OF THE INVENTION

1. Field of the Invention

The invention is directed to a pipe connection.

2. Description of the Prior Art

A pipe connection of the generic type is manufactured by Geberit. In this system, a composite pipe, as it is called, is pushed onto a red-brass fitting. The composite pipe comprises an inner pipe with an aluminum jacket which conducts liquid and a sheathing pipe which is arranged over the inner pipe and serves for external protection. The inner pipe and the sheathing pipe are manufactured from plastic. The fitting has a region which extends in the longitudinal direction and which is provided with a stop, wherein the pipe to be connected is pushed on up to this stop. The region adjacent to the stop has two inner grooves, a sealing ring being arranged in each inner groove. The remaining portion is highly contoured, so that the pipe which is pushed on molds itself to the contour during pressing. After the pipe is pushed on, pressing tongs are applied externally and the pipe is pressed on in the area of the sealing ring as well as in the contoured area. In this case, the sealing ring area assumes the sealing function and the contoured area serve to axially secure the pipe and fitting. A disadvantage in this prior art system is that the composite pipe can be used only for a narrow range of temperature and pressure. Further, the manufacture of the fitting is complicated because the contoured end regions and the sealing ring region must be produced very precisely.

Another press connection system is manufactured by Deutsche ALWA GmbH. In this system for copper pipes and copper fittings, a continuous rubber collar is arranged in the interior of the fitting which is almost smoothly flush. In the center, the collar has a web or ridge which extends radially inward and serves as a stop for the pipes that are pushed in. A flanging or beading is provided on the inside around the front end regions of the fitting for fixing the inserted rubber collar axially. Two spaced beads are formed externally on the fitting by pressing tongs having a wide pressing jaw. This is carried out in such a way that the pushed in pipe is pressed in in this region. A disadvantage in this system consists in that the pressing jaw occupies extensive space, so that pressing is impossible in confined areas. Further, a lengthening is required for the majority of fittings, especially in the case of T-pieces, so that the pressing tongs can be applied.

A prior art reference DE 91 13 050 U1 discloses a connection for conduit or line pipes comprising a fitting having a connection piece. A protective sleeve covering the connection piece is detachably arranged on the fitting at a distance radially from the connection piece, and a composite pipe whose end area can be connected with the connection piece accompanied by radial plastic deformation. The connection piece has a sealing ring. In order to connect the end of the composite pipe with the connection piece, the protective sleeve is separated from the fitting and pushed back on the pipe until the end of the composite pipe can be pressed radially with pressing tongs accompanied by deformation. After pressing and after the pressing tongs have been removed, the protective sleeve is connected again with the fitting in the original manner, so that the deformed region of the composite pipe is not visible from the outside, wherein the protective sleeve that is pushed on also protects against bends or kinks. This line connection is very complicated to produce because the connection piece of the fitting must be specially constructed to afford adequate axial securing and sealing of the composite pipe which is pressed thereon. Further, the sealing location is too far away from the front of the connection piece of the fitting to exclude gaps between the outer surface of the connection piece and the inner surface of the pushed on composite pipe.

A different prior art arrangement of a line pipe connection is disclosed in reference DE-GM 74 06 802. This prior art arrangement comprises a coupling ring made of thermoplastic for connecting butt-jointed pipe ends with external reinforcements such as ribs, beads or the like. The coupling ring has a circumferentially extending bead, which engages in the gap between the butt-jointed pipe ends, and annular surfaces whose outer diameter narrows conically toward the ends of the coupling rings. The coupling ring can be inserted into the pipe ends and fastened by gluing, preferably by means of a two-component cement, so as to form a connection through the agency of a bonding substance. This pipe connection has the disadvantage that the pipes to be connected must be provided with external reinforcements in order to ensure the required stiffness of the connection. Further, the coupling ring must be provided with conical ring surfaces to ensure flawless cementing.

SUMMARY OF THE INVENTION

It is an object of the invention to provide a pipe connection of the type mentioned above which comprises elements that are simple to produce, is suitable for higher pressures and temperatures, and in which the danger of gap formation is excluded while retaining the ability to detect the insertion depth.

This object is met by the features indicated in the characterizing part of the claims.

In the pipe connection according to the invention, the required positioning of the pipe on the fitting, wherein the pipe is pushed on the fitting, can advantageously be visually detected directly without auxiliary means. The metal press connection by means of deformation of the pipe and fitting which has been proven successful for years is retained, so that high axial longitudinal forces and accordingly high internal pressures can be transmitted. In special cases where requirements for axial securing are extremely exacting, two or more bead-like indentations or crimps at a distance from one another may be required. In this respect, it is essential to the invention that the distance from the deformation location to the front of the fitting is so small that the seal located in this region is included in the deformation. In this way, the formation of gaps between the outer surface of the fitting and the inner surface of the pushed on pipe is prevented.

The stop is advantageously constructed as a roof-like or flange-like bead so that it can be produced in a simple manner using for example, press machines or turning machines. The seal is preferably made of an elastomer such, for example, as butyl rubber, EPM, and fluoro rubber. Depending on the intended use, other sealing materials may also be used, particularly in the case of higher temperatures and aggressive media which must be transported. In order to keep the cross-sectional change in the connection region as small as possible, a range of 0.5 to 10 mm is selected for the thickness of the seal in conformity to the pipe diameter. The end region of the fitting, including the stop, can be pressed from a pipe section or made from solid material by turning or extrusion. This base element can be connected with an elbow, a T-piece or a threaded part by welding. In special cases, the stop may even be dispensed with if the element to be connected, e.g., a threaded part, has its own stop.

A further embodiment in which the above-stated object may be met is characterized in that a hardening cement is applied in the contact region between the outer surface of the fitting and the inner surface of the pushed on pipe. In this way, a bonding substance-type engagement is produced which assumes the function of sealing and also prevents axial displacement. A special glue such, for example, as an epoxy-based two-component cement, is preferably used. The advantage of this connection technique consists in that no pressing tools are required in the case of low line-pressures. In this case, the selected wall thickness of the pipe and fitting may be very thin because they need not be configured to take into account pressing, but rather only have to withstand internal pressure. The thinness of the wall of the fitting has the added advantage that the inner diameter of the line is only slightly reduced. If higher line pressures are required, this pipe connection can be mechanically pressed in addition to the gluing.

Compared with the glued pipe connections in fittings and pipelines produced from plastic, the suggested system has the advantage that the field of use is considerably expanded as regards temperature and internal pressure.

When laying pipe, it may be necessary, depending on the field of use, e.g., in a constantly moist space, to protect the outer surface. A plastic coating of the pipes, known per se, has proven to be particularly advantageous. This also applies to the outer region of the stop of the fitting.

The pipe connection according to the invention is described more fully in the drawing with reference to several embodiment examples.

BRIEF DESCRIPTION OF THE DRAWINGS

FIG. 2 shows a variant of the first embodiment form of the pipe connection according to the invention in a view corresponding to FIG. 1;

FIG. 3 shows another embodiment form of the pipe connection according to the invention in a view corresponding to FIG. 1.

DETAILED DESCRIPTION OF THE PREFERRED EMBODIMENT

Figure 1:
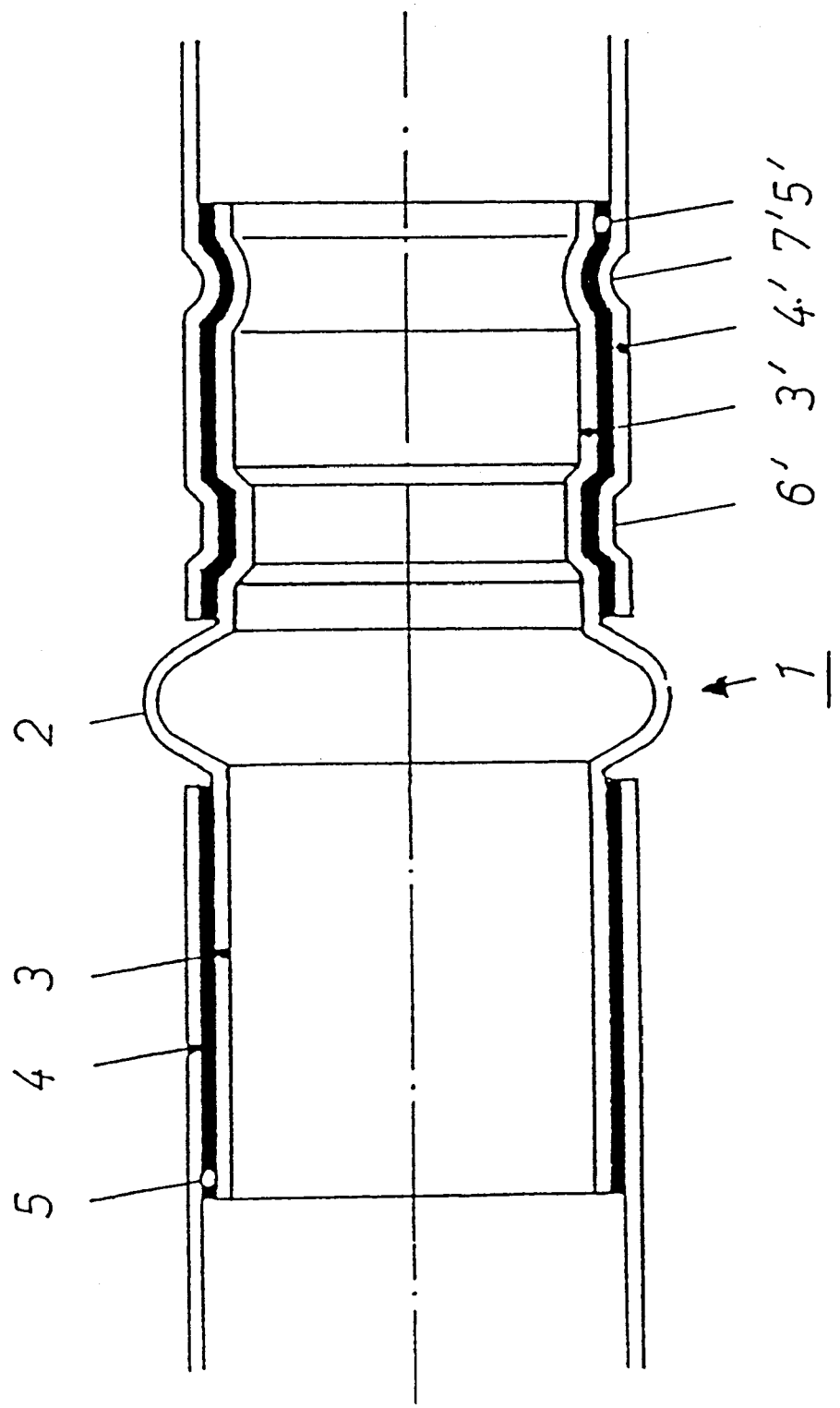
FIG. 1 shows a longitudinal section through a first embodiment form of the pipe connection according to the invention.

FIG. 1 shows a first embodiment form of the pipe connection according to the invention in longitudinal section, wherein the state prior to pressing is shown in the left-hand half of the illustration and the state after pressing is shown in the right-hand half of the illustration. The core of the connection is a fitting 1 made from plastically deformable metal which has a stop 2 extending radially outward. Adjoining this stop 2 on at least one side is a cylindrical portion extending in the longitudinal direction. FIG. 1 shows two cylindrical portions 3, 3' extending from the stop 2. In this embodiment example, two line pipes 4, 4' which are made from plastically deformable metal and have smooth ends are respectively pushed over the two cylindricla portions 3, 3' of the fitting 1, namely, up to the stop 2. In the contact regions between the fitting 1 and the line pipes 4, 4', seals 5, 5' are respectively arranged between the outer surfaces of the cylindrical portions 3, 3' of the fitting 1 and the inner surfaces of the two line pipes 4, 4'. The seals 5, 5' extends over their entire respective contact regions. To facilitate pushing on, the outer surface of the seal 5, 5' is wetted with a liquid or lubricated with a soapy substance. In this embodiment form, sealing is carried out by the seal 5, 5', so that the liquid to be transported cannot leak out. If necessary and depending on the line pressure, two bead-like press locations 6', 7' can be formed one after the other by means of a pressing tool, not shown, so that this connection can also transmit the axial forces brought about by the internal pressure, wherein one bead-like press location 7' is located adjacent at the terminal end of the cylindrical portion 3'. This embodiment is shown on the right side of FIG. 1. The press locations 6', 7' are characterized in that both the fitting 1 and the respective pushed on pipe 4' are included in the deformation. The type of pressing such, for example, as the hexagonal shape of the pin location 6' or the lemon-shaped segment of pin location 7', depends on the contour of the opening of the pressing jaws, not shown.

FIG. 2 shows a variant of the above-described embodiment form in the same longitudinal sectional view. The same reference numbers have been used for identical parts. In pipe connections in which an unalloyed steel, for example is used for the fitting 1 and line pipes 4, 4', it may be necessary, depending on the field of use, to protect the outer surface from corrosion. For this purpose, the respective line pipe 4, 4' is coated in a manner known per se with a plastic jacket 9, 9'. The exterior of the cylindrical portion 3, 3' of the fitting 1 is likewise enclosed by plastic 8 or is coated with plastic paint. When the line pipes 4, 4' are pushed on, care must be taken that the respective end face of the line pipe 4, 4' reaches to the sheathing 8 of the stop 2. When pressing the two bead-like press locations 7, 7', the plastic jacket 9, 9' is included in the deformation. This process has the advantage that only minor subsequent working, if any, is required after pressing.

FIG. 3 shows another embodiment form of the pipe connection according to the invention in the same longitudinal section as FIG. 1. The same reference numbers have again been used for identical parts. In contrast to FIG. 1, a hardening glue 10, 10', for example, is arranged instead of a seal in the contact region between the outer surface of the fitting 1 and the inner surface of the respective pushed on pipe 4, 4'. After hardening, this glue 10, 10' provides a bonding substance-type connection, wherein the glue 10, 10' performs the sealing function as well as axial securing. Since the forces to be transmitted by a connection of this kind are limited, a bead-like pressing can be formed in addition in a manner comparable to FIG. 1. For lower pressure levels, the glue connection will be sufficient, whereas the additional mechanical axial securing is preferred for higher pressures and for possible additional vibration stresses in the lines.

I claim:

1. A pipe connection for a pipe system conducting a liquid or gaseous medium, comprising:

a pipe having a smooth-ended end portion;

a fitting comprising a sleeve-like region having a first terminal end and a second terminal end and a stop intermediate said first and second terminal end said sleeve-like region, said stop extending radially outward relative to an outer surface of said sleeve, said smooth-ended end portion of said pipe being pushed over one of said first and second terminal ends of said sleeve-like region and forming a contact region between said pipe and said fitting from said stop to said one of said first and second terminal ends;

continuous elastic seal arranged between said pipe and said fitting along said entire contact region;

each said pipe and said fitting comprising a plastically deformable metal wherein said contact region comprises a bead-like deformation encompassing said pipe and said fitting and formed by an externally applied pressing tool for axially securing said pipe and said fitting, said deformation causing a grip of said continuous seal between said pipe and said fitting, a distance between said deformation and said one of said first and second terminal ends of said sleeve-like region is sufficiently small so that said continuous seal at said one of said first and second terminal end is encompassed by said grip of said deformation thereby preventing gaps being formed between said continuous seal and said pipe and between said continuous seal and said fitting at said one of said first and second terminal ends thereby preventing the medium from entering said contact region between said pipe and said fitting.

2. The pipe connection of claim 1, wherein said continuous seal comprises an elastomer material.

3. The pipe connection of claim 1, wherein said continuous seal comprises a thickness with a range including 0.5 to 10 mm.

4. The pipe connection of claim 1, wherein each said pipe and said metal fitting comprise non-rusting steel.

5. The pipe connection of claim 1, wherein each said pipe and said metal fitting comprise titanium.

6. The pipe connection of claim 1, wherein said fitting comprises an anti-corrosive agent applied to said outer surface of said sleeve-like region.

7. The pipe connection of claim 6, wherein said anti-corrosive agent comprises a plastic coating.

8. The pipe connection of claim 1, wherein said pipe comprises an anti-corrosive agent applied to an outer surface of said pipe.

9. The pipe connection of claim 8, wherein said anti-corrosive agent comprises a plastic coating.

* * * * *